(12) United States Patent
Le Lann et al.

(10) Patent No.: US 9,380,101 B2
(45) Date of Patent: Jun. 28, 2016

(54) METHOD OF MANAGING A PLURALITY OF AUDIOVISUAL SESSIONS IN AN IP NETWORK, AND AN ASSOCIATED CONTROL SYSTEM

(75) Inventors: Pierre-Yves Le Lann, Lannion (FR); Gaël Fromentoux, Pleumeur-Bodou (FR)

(73) Assignee: Orange, Paris (FR)

( * ) Notice: Subject to any disclaimer, the term of this patent is extended or adjusted under 35 U.S.C. 154(b) by 1423 days.

(21) Appl. No.: 12/593,322

(22) PCT Filed: Mar. 28, 2008

(86) PCT No.: PCT/FR2008/050562
§ 371 (c)(1),
(2), (4) Date: Sep. 28, 2009

(87) PCT Pub. No.: WO2008/132414
PCT Pub. Date: Nov. 6, 2008

(65) Prior Publication Data
US 2010/0095005 A1    Apr. 15, 2010

(30) Foreign Application Priority Data
Mar. 30, 2007    (FR) ...................................... 07 54180

(51) Int. Cl.
*G06F 15/16*    (2006.01)
*H04L 29/06*    (2006.01)

(52) U.S. Cl.
CPC ............. *H04L 65/80* (2013.01); *H04L 65/1016* (2013.01); *H04L 65/4084* (2013.01)

(58) Field of Classification Search
CPC ........................................................ H04L 65/80
USPC ................................................. 709/231, 233
See application file for complete search history.

(56) References Cited

U.S. PATENT DOCUMENTS

| 7,536,469 B2 * | 5/2009 | Chou et al. ..................... 709/231 |
| 7,725,557 B2 * | 5/2010 | Klemets et al. ............... 709/213 |
| 8,315,315 B2 * | 11/2012 | Amonou ................. H04L 19/14 375/240.27 |
| 8,516,532 B2 * | 8/2013 | Ulm et al. ........................ 725/95 |
| 2002/0002618 A1 * | 1/2002 | Vange .......................... 709/228 |

(Continued)

FOREIGN PATENT DOCUMENTS

EP    1 670 209 A1    6/2006

*Primary Examiner* — Douglas Blair
(74) *Attorney, Agent, or Firm* — Drinker Biddle & Reath LLP

(57) ABSTRACT

The invention relates to a method of managing a plurality of multimedia sessions involving user terminals connected to an access point of an IP network including at least one collection node when at least one audiovisual first session is in progress during which a first user terminal receives an audiovisual content encoded in the form of a plurality of SVC audiovisual streams via a link between said access point and said at least one collection node. The method of the invention receives a change request relating to a second session that is one of said plurality of sessions, recovers information relating to a context of said plurality of sessions, evaluates a new distribution of resources between said first session in progress and the second session, decides to accept or reject the change request as a function of the result of said evaluation and sends a message containing its decision. In the event of a positive decision, it commands adaptation of the transfer of the audiovisual content effected on said link during the first session by modifying a plurality of audiovisual streams to be transmitted.

13 Claims, 3 Drawing Sheets

(56) References Cited

U.S. PATENT DOCUMENTS

| | | |
|---|---|---|
| 2002/0059627 A1 | 5/2002 | Islam et al. |
| 2002/0174227 A1* | 11/2002 | Hartsell et al. ............... 709/226 |
| 2003/0069963 A1 | 4/2003 | Jayant et al. |
| 2003/0210672 A1* | 11/2003 | Cromer et al. ............... 370/338 |
| 2004/0081198 A1* | 4/2004 | Gardner ................. H04N 7/52 370/468 |
| 2004/0165545 A1* | 8/2004 | Cook ........................... 370/315 |
| 2005/0117641 A1* | 6/2005 | Xu et al. .................. 375/240.08 |
| 2005/0166245 A1* | 7/2005 | Shin et al. ..................... 725/104 |
| 2006/0165166 A1* | 7/2006 | Chou et al. ............... 375/240.05 |
| 2006/0224763 A1* | 10/2006 | Altunbasak ............. H04L 69/14 709/231 |
| 2007/0027983 A1* | 2/2007 | Bowra et al. .................. 709/224 |
| 2008/0098446 A1* | 4/2008 | Seckin et al. .................. 725/114 |
| 2008/0259852 A1* | 10/2008 | Massiera et al. ............... 370/329 |
| 2010/0142915 A1* | 6/2010 | McDermott et al. ............ 386/68 |

\* cited by examiner

METHOD OF MANAGING A PLURALITY OF AUDIOVISUAL SESSIONS IN AN IP NETWORK, AND AN ASSOCIATED CONTROL SYSTEM

CROSS-REFERENCE TO RELATED APPLICATIONS

This application is the U.S. national phase of the International Patent Application No. PCT/FR2008/050562 filed Mar. 28, 2008, which claims the benefit of French Application No. 07 54180 filed Mar. 30, 2007, the entire content of which is incorporated herein by reference.

FIELD OF THE INVENTION

The present invention relates to a method of managing a plurality of audiovisual sessions involving a plurality of terminals connected to an IP network.

The invention also relates to a system for controlling audiovisual services using this kind of management method.

The invention further relates to a service management platform including such a system.

The invention further relates to an access point connecting a plurality of terminals to an IP network including such a platform.

The invention further relates to a conversational session control entity adapted to relay a change request relating to a conversational session to said control system.

The present invention finally relates to a computer program implementing the method when it is executed by a processor.

The field of the invention is that of telecommunications. The invention applies in a particularly advantageous manner to the field of IP networks for distributing audiovisual contents.

BACKGROUND OF THE INVENTION

IPTV (Internet Protocol TeleVision) architectures have been developed to provide services over IP networks including multicast digital television, video on demand (VoD), television on demand (Catch-up TV or TVoD), and digital video recorder functions activated on television or video streams such as NPVR (Network-based Personal Video Recorders) or real time live TV stream control (Network-based Time Shifting (NTS), also known as Pause Live TV). Such architectures use streaming and multicast mechanisms.

A streaming or point-to-point mechanism transports a data stream from a source to a destination continuously, the stream being processed on the fly at the destination without having to store it in its entirety.

In an IPTV architecture, a stream consists of a series of IP packets transporting an audiovisual content. These packets are sent by the source in the same chronological order as the multimedia data that they transport.

A multicast or point-to-multipoint mode of broadcasting over a transport network organizes and optimizes sending the same data stream from a source to a plurality of destinations.

At present, most audiovisual stream transport systems are based on encapsulation standards close to the DVB (Digital Video Broadcasting) standard and the MPEG (Motion Picture Experts Group) audiovisual content coding standard. Those standards propose various protocols for encapsulating the audiovisual streams in order to transport them in fixed and mobile IP networks.

Transporting audiovisual streams requires a high bandwidth. The use of an IPTV service therefore makes it necessary to size and plan the network accordingly and to distribute network resources between subscribers to the service.

At present there exist as many cohabiting IPTV architectures as there are different types of user terminal and access network. An IPTV service can be accessed from a television or a PC via a WiMAX or xDSL (Digital Subscriber Line) fixed IP access network or from a mobile telephone via a 3G UMTS (Third Generation Universal Mobile Telecommunications system) mobile IP access network. The various offers (via TV, PC, or mobile telephone) are at present independent. This multiplicity of infrastructures (mobiles, fixed, even IPTV, and Internet TV) leads to a situation that is hardly the optimum in terms of deployment and maintenance costs, consumption of network bandwidth, and storage on the installed base of content servers. Moreover, there is only very limited interaction between services offered in the mobile world and those offered in the fixed world.

Moreover, it should be noted that, in a fixed service (xDSL) context, the cohabitation of TV-HD and TV-SD offers at present requires the simultaneous transporting of HD (high definition) and SD (standard definition) versions of the same audiovisual content on the various network segments (backbone and collection) and as far as the first DSL collection node or DSLAM (Digital Subscriber Line Access Multiplexer).

The situation will be exactly the same if the IPTV service is widened to mobile terminals, for which one or more additional versions of the audiovisual content will have to be produced, stored, and transported to enable the user to access content interchangeably from a fixed access point (WiMAX, WiFi Hotspot) or from a mobile access point (3G UMTS).

In a fixed service (xDSL) context, the ability of the subscriber to access one or more audiovisual services is set up and then configured statically in the network. This solution is highly inflexible. It does not estimate the available network resource at a given time or adapt audiovisual content distribution conditions dynamically as a function of the resources available to optimize the cohabitation of multimedia (audiovisual, conversational, Internet, etc.) services, possibly between a plurality of users connected to the same access point.

There is therefore a need to alleviate these drawbacks of the prior art in order to provide a better response to the expectations of users.

To be more precise, there is a need for a solution that dynamically adapts audiovisual content distribution conditions as a function of the resources available on a link between a network entity and a user terminal's network access point.

There is also a need to manage a plurality of multimedia sessions in parallel, whether of audiovisual, conversational, or other type.

There is further a need to optimize the sharing of resources on a given link between a plurality of multimedia sessions based on dynamic management of the available resources.

There is a yet further need for a multimedia session management architecture capable of managing all types of multimedia session, regardless of the access network from which they come or the type of terminal that requested them.

SUMMARY OF THE INVENTION

The invention responds to this need by proposing a method of managing a plurality of multimedia sessions involving user terminals connected to an access point of an IP network including at least one collection node when at least one audiovisual first session is in progress during which a first user terminal receives an audiovisual content encoded in the form of a plurality of scalable video coding (SVC) audiovisual streams via a link between said access point and said at least one collection node.

According to the invention, said method is noteworthy in that it includes the steps of:

receiving a message including a change request relating to a second session that is one of said plurality of sessions;

recovering information relating to a context of said plurality of sessions including at least a quantity of resources available on said link, a quantity of resources used by said at least one session, and a minimum quantity of resources required for said change in the second session;

evaluating a new distribution of resources between said at least one first session in progress and said second session induced by the requested change in the second session from the quantity of resources available on the link, the quantity of resources used by said at least one session, and the minimum quantity of resources required for said change;

deciding to accept or reject the change request as a function of the result of said evaluation and sending a message containing said decision; and in the event of a positive decision, commanding adaptation of the transfer of the audiovisual content effected on said link during said first session by modifying a plurality of audiovisual streams to be transmitted.

Thus the invention solves the technical problem of dynamically managing a plurality of multimedia sessions and optimally sharing resources available on a link that can constitute the whole or part of the path between the access point and the collection node and transports data streams to the user terminal.

The context information recovery step indicates, at a given time, the status of resources available on the link, the current distribution of resources between the sessions in progress, and the resources necessary for effecting the requested change.

Using this information, the evaluation step evaluates the possibility of a new distribution of the resources that would satisfy the change request relating to the second session. For example, it estimates the quantity of resources used in the audiovisual first session in progress that can be pre-empted and compares the result to the minimum quantity of resources necessary to satisfy the change request if it requires resources.

If it proves possible to satisfy the change request by distributing resources differently, the request is accepted, an acceptance message is sent to the entity responsible for effecting the requested change, and a resource adaptation step effects the new distribution of resources that has been calculated. This adaptation can be reflected in a change of the number of scaled audiovisual streams to be transmitted by said link to the access point for the sessions in progress. Clearly, in this situation, adaptation never consists in destroying IP packets of a stream relating to a portion of the audiovisual content, but rather in modifying the conditions for distribution of that audiovisual content on the link to the access point of the first user terminal.

Such modification of the audiovisual content distribution conditions is made possible by scaled encoding of that content. Scaled encoding enables partial decoding of the audiovisual streams representing the content. To be more precise, a base stream yields a decoded audiovisual of basic quality. If an enhancement stream is also decoded, a decoded audiovisual content of improved quality is obtained.

According to the invention, the number of streams sent on the link for the first audiovisual session is adapted as a function of the resources available on that link, other sessions in progress, and change requests received.

According to one aspect of the invention, the step of recovering context information sends requests to entities of the IP network responsible for managing said plurality of sessions and stores the recovered information in profiles associated with the user terminals.

Those entities are, for example, for an audiovisual session the access point or for a conversational session a call session control entity or a call server.

One advantage is the updating of profiles associated with the user terminals involved in sessions in progress.

According to one aspect of the invention, said plurality of scaled audiovisual streams is transported in point-to-point mode on said link and the step of adapting the transfer of the audiovisual content sends the first terminal via said link a message containing adaptation parameters designating audiovisual streams that it can request to receive from a service management platform.

This aspect of the invention relates to audiovisual sessions in which the audiovisual streams are sent to the first user terminal at least partly in point-to-point mode. This applies, for example, to the situation where the first user terminal is involved in a VoD session in progress. It should also be noted that although at present existing IP TV architectures provide for broadcasting of audiovisual streams to the user terminal in point-to-multipoint mode, hybrid architectures could be envisaged in the near future in which audiovisual streams are sent in point-to-multipoint mode in an upstream portion to a network entity and then in point-to-point mode in a downstream portion. This kind of configuration would be of particular benefit for a mobile network, with an architecture that is better suited to the point-to-point transport mode and does not have the bandwidth necessary for point-to-multipoint broadcasting. For example, broadcasting could be effected on the upstream side of an SGSN or GGSN (GPRS support node) and in point-to-point mode on its downstream side. This would also be beneficial for Internet users connected to ATM collection networks, which are also not well suited to transporting streams in point-to-multipoint mode.

According to one aspect of the invention, the first terminal receives adaptation parameters established by the control step of the method of the invention and translates them into a message, for example a message conforming to the RTSP (Real Time Streaming Protocol), that is sends, for example, to a service management platform that relays it to a content server responsible for broadcasting the audiovisual content.

According to another aspect of the invention, said plurality of SVC audiovisual streams is transported by a plurality of broadcast groups and the audiovisual content transfer adaptation command step sends the first terminal via said link a message containing adaptation parameters designating the broadcast groups to or from which said first user terminal can subscribe or must unsubscribe.

An advantage of this solution is the distribution of specific paths. The terminal is dedicated to requests linked to an audiovisual service.

According to this particular aspect of the invention, the audiovisual streams are broadcast using multicast IP broadcast groups. Thus adaptation as such is effected by the terminal concerned, which translates received adaptation parameters into a request to the collection node. This request relates either to subscribing to or to unsubscribing from a particular broadcast group, depending on the type of adaptation parameters received. A broadcast group includes a stream including a portion of the encoded audiovisual content. In this situation, the terminal translates the adaptation parameters into as many subscribe/unsubscribe messages to the collection node as there are broadcast groups concerned. One such subscribe/ unsubscribe message is, for example, an IGMP (Internet Group Management Protocol) report/leave message, of the same type as the message generated after pressing a remote control key corresponding to an audiovisual program channel. The terminal sends its subscribe/unsubscribe message to a collection node, for example the first DSLAM or MSAN collection node for a fixed IP access network. This message can then be translated to another protocol, for example the PIMP (Protocol Independent Multicast Protocol), for forwarding to network entities further upstream, as far as a content server.

In this embodiment, the terminal is also dedicated to requests linked to an audiovisual service.

According to another aspect of the invention, if the change request is a request to set up the second session, said adaptation parameters designate the broadcast groups from which said first terminal must unsubscribe.

Setting up a second session, whether conversational or audiovisual, requires available resources that are recovered from the audiovisual first session by forcing the first terminal to unsubscribe from at least one broadcast group.

Alternatively, if the change request relating to the second session aims to close the session, said adaptation parameters designate the broadcast groups to which said first terminal can subscribe.

On closing the second session resources are released and the first session can benefit from them at least in part by subscribing to additional broadcast groups. This improves the quality of the received audiovisual content.

According to another aspect of the invention, said second session is a conversational session managed by a session control entity and said method is noteworthy in that said change request is received from said session control entity and said message containing said decision is sent to said session control entity.

According to this aspect of the invention, communication is set up between the session control entity that manages the conversational second session and the multimedia session control system so that the multimedia session control system implementing the method of the invention is aware of change requests relating to sessions that are not audiovisual sessions and can recover information relating thereto in order to store it in the profiles that it keeps up to date. In return, the multimedia session control system implementing the method of the invention sends it the message indicating whether it rejects or accepts the request.

According to another aspect of the invention, the recovered information includes at least one type of subscription of said first and second users and said evaluation step takes account of the type of subscription of said first and second users in evaluating a new distribution of resources.

If the request relates to access to an audiovisual content, an indication of the type of subscription verifies that the second user has a subscription entitling them to this type of service. It also verifies that the first user has a subscription for which it is possible to downgrade the quality of the audiovisual content received during a session, should the request be a session set-up request. In contrast, for a session closing request, it can be beneficial to prioritize the users involved in sessions in progress to choose which session will have priority for the resources released by closing the second session, according to the type of subscription (gold, silver, bronze).

In a correlated way, the invention also relates to a system for controlling a plurality of multimedia sessions involving user terminals connected to an access point of an IP network including at least one collection node when at least one audiovisual first session is in progress during which a first user terminal receives an audiovisual content encoded in the form of a plurality of SVC audiovisual streams via a link between said access point and said at least one collection node.

The control system of the invention is noteworthy in that it includes:

means for receiving a change request relating to a second session that is one of said plurality of sessions;

means for recovering information relating to a context of said plurality of sessions including at least a quantity of resources available on said link and a minimum quantity of resources required to effect said change in the second session;

means for evaluating the possibility of a new distribution of resources between said at least one first session in progress and said second session induced by the requested change in the second session, which can be used if the minimum quantity of resources required is greater than the quantity of resources available on said link; and means for deciding to accept or reject the change request adapted, in the event of a positive decision, to command adaptation of the transfer of the audiovisual content effected on said link during said first session to effect said new distribution of resources.

According to one aspect of the invention, said control system includes means for sending a message accepting said request to an entity of the network responsible for effecting the change requested.

The multimedia session control system is therefore able to exchange messages with the various network entities responsible for controlling the plurality of sessions in progress. It is clearly able to use different types of protocol to exchange messages with those entities.

The invention further relates to a platform for managing audiovisual services connected to an IP network, noteworthy in that it includes a control system for controlling a plurality of sessions involving user terminals connected to an access point of an IP network including at least one collection node when at least one first session is in progress during which a first user terminal receives an audiovisual content via a link between said access point and said at least one collection node, said audiovisual content being encoded in the form of a plurality of SVC audiovisual streams, said system including:

means for receiving a change request relating to a second session that is one of said plurality of sessions;

means for recovering information relating to a context of said plurality of sessions; and means for evaluating the possibility of a new distribution of resources between said at least one first session in progress and said second session induced by the requested change in the second session.

The invention further relates to an access point for connecting a plurality of user terminals involved in a plurality of multimedia sessions to a collection node of an IP network including at least one collection node, at least one audiovisual first session being in progress between a first user terminal and said collection node during which said first terminal receives an audiovisual content encoded in the form of a plurality of SVC audiovisual streams via a link between said access point and said at least one collection node, said access point being characterized in that it includes:

means for transferring a change request relating to a second session to a session control system of said IP network; and means for transferring to said first user terminal from said audiovisual session control system a message containing adaptation parameters of said first decision for effecting a new distribution of resources in response to said change request.

The invention further relates to a session control entity responsible for managing a change relating to a conversational second session that is one of a plurality of audiovisual sessions involving user terminals connected to an access point of an IP network including at least one collection node when at least one audiovisual first session is in progress during which a first user terminal receives an audiovisual content encoded in the form of a plurality of scalable audiovisual streams via a link between said access point and said at least one collection node.

According to the invention, said entity is noteworthy in that, said IP network including a multimedia session control system, said session control entity includes means for recovering information relating to a context of said plurality of sessions and means for sending a change request to said system, which includes:

means for receiving a message including a change request relating to said second session;

means for recovering information relating to a context of said plurality of sessions;

means for evaluating the possibility of a new distribution of resources between said at least one first session in progress and said second session induced by the change requested for the second session; and means for adapting the transfer of the audiovisual content effected on said link during said first session to effect said new distribution of resources.

The session control entity can be an S-CSCF (Serving-Call Session Control Function) call server in an IMS (IP Multimedia Subsystem) architecture that manages switching to a service requested by the user. The recovery means can designate the method of interrogating an HSS (Home Subscriber Server) database via an I-CSCF (Interrogating-Call Session Control Function) interrogation server or recovering context information held by the control system of the invention.

According to the invention, the session control entity relays to the control system a change request relating to a second session sent by a second user terminal. It advantageously sends the change request to the control system, for example if the second user subscribes to an audiovisual service. It should be noted that this can apply equally to the S-CSCF entity of the calling user and to that of the called user.

In one particular embodiment, the various steps of the method of controlling a plurality of multimedia sessions are determined by computer program instructions.

Consequently, the invention further relates to a computer program product downloadable from a communications network and/or stored in a computer-readable medium and/or executable by a microprocessor, noteworthy in that it includes program code instructions for executing the control method of the invention.

The invention relates finally to a computer-readable information medium containing instructions of a computer program as referred to above.

BRIEF DESCRIPTION OF THE DRAWINGS

Other advantages and features of the invention become more clearly apparent on reading the following description of one particular embodiment of the invention, given by way of illustrative and non-limiting example only, and from the appended drawings, in which.

DETAILED DESCRIPTION

The general principle of the invention is to insert into an IP network a multimedia session control system which, having access to dynamic context information relating to all sessions in progress on a particular network link, is able to optimize the distribution of resources between those sessions.

Figure 1:
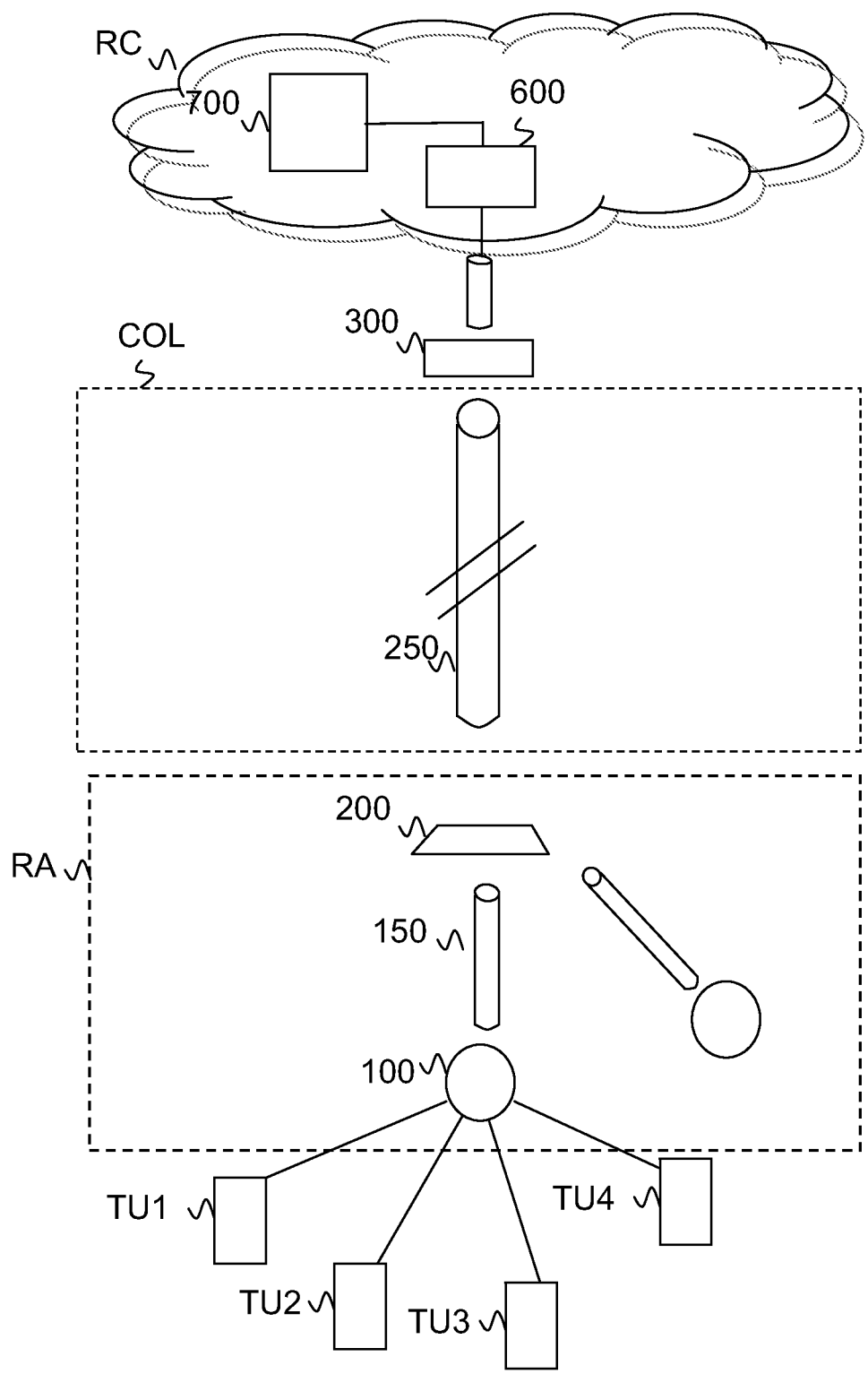
FIG. 1 shows diagrammatically an IP network connected to a prior art service platform.

FIG. 1 shows an IP network 1 using a prior art TP IPTV television service architecture. This kind of IP network includes a core network RC connected to a plurality of collection networks via a multimedia node 300. A collection network is structured in the form of rings to distribute over a region television over IP channels. In France, the Brittany collection network includes, for example, the Brest collection ring, the Redon collection ring, etc. For clarity, only one collection network is shown in FIG. 1. This collection network COL links the multimedia node 300 to a first collection node 200. This first collection node 200 is part of an access network RA. The access network is an xDSL broadband fixed IP network or a mobile IP network, for example. It includes a first collection node 200 that is a DSLAM (Digital Subscriber Line Access Mode) node using the ATM (Asynchronous Transfer Mode) technology, for example, or a MSAN (Multimedia Services Access Network) using the IP technology for a fixed IP network or a UMTS antenna for a mobile IP network. It is the node nearest the user, in other words the last IP node of the operator receiving a portion of the audiovisual streams. The first collection node 200 is connected to a plurality of access points, for example the access point 100 represented in FIG. 1. The access point is a home gateway, a WiFi hotspot, or a WiMAX or UMTS (Universal Mobile Telecommunications system) antenna, for example.

The access point connects a plurality of user terminals TU1 to TU4 to the IP network.

Clearly these user terminals must share resources on the link 150, 250 between the access point 100 and the first collection node 200. As a general rule, the invention applies to N user terminals connected to M access points involving K multimedia sessions, where N, M, and K are integers greater than or equal to 1.

One object of the invention is to propose a solution for optimizing the use of resources on such links regardless of the access mode or type of terminal used.

In this regard, it should be noted that the invention applies to any type of link, even one further upstream in the IP network, provided that it is used to transport data during multimedia sessions involving user terminals connected to the access point 100. The link can be either part of or the whole of the link connecting the multimedia node 300 to the access point 100 via the first selection mode 200 or a link further upstream and not shown in FIG. 1.

An audiovisual services management platform 700 is connected to the core network RC. This kind of prior art audiovisual services management platform is specifically dedicated to one type of access network, for example xDSL, and one type of terminal, for example a television or a PC. It can therefore set up sessions only with terminals of that type. Moreover, the portion of the resources available on the link 150, 250 that is allocated to the television over IP service is fixed a priori and statically.

Figure 2:
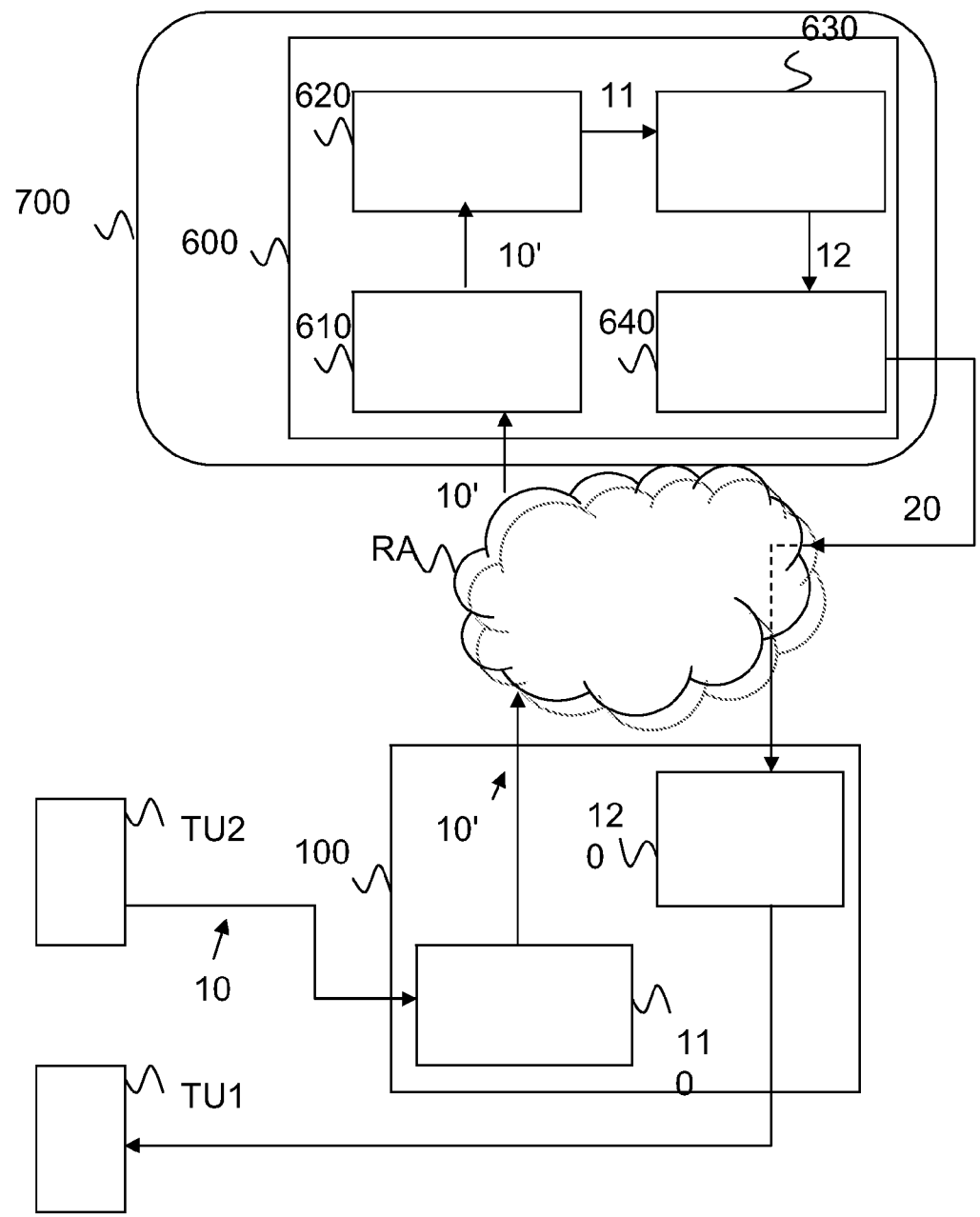
FIG. 2 shows diagrammatically an IP network using a method and a system of the invention for controlling a plurality of audiovisual sessions.

FIG. 2 shows a system 600 of the invention for controlling a plurality of audiovisual sessions that can be used in the IP network 1. Such a system can advantageously be hosted by the service platform 700. In another embodiment, it can be independent of the audiovisual services management platform and hosted by another network equipment, for example an equipment implementing a proxy function for the RTSP protocol, a call server responsible for implementing conversational services in an IP network or a conversational session control entity.

The invention is not limited to this particular situation, however, and distributing the functions of the control system 600 over a plurality of equipments of the core network RC can also be envisaged.

A configuration is considered below in which a first user terminal TU1 is involved in an audiovisual first session during which it receives audiovisual content broadcast by a content server. For reasons of clarity, that server is not shown in FIG. 2. It should be noted, however, that it is generally located in the core network RC.

It should also be noted that the invention is not limited to broadcasting contents, such as broadcasting TV channels over the IP network, i.e. to transporting audiovisual streams in point-to-multipoint (multicast) mode, but applies equally to sending audiovisual streams in point-to-point (unicast) mode, such as sending a streamed audiovisual stream in the context of a Video on Demand (VoD) session.

A second user terminal TU2 sends the IP network a change request relating to a second session. This request can be a request to set up the second session, for example a request to set up a call to a user terminal connected to another access point of another access network or a request to close a session. This change request can equally relate to a request to improve the quality of the session in progress, for example a request to switch from SD quality to HD quality for receiving a television over IP program.

Such change requests are received by the access point 100 that connects the user terminal TU1 to the access network RA of the IP network. For example, this access point is a home gateway, a WiFi hotspot, etc.

According to the invention, the access point 100 includes means 110 for transferring the change request 10 relating to the second session to an audiovisual session control system 600 of said IP network in the form of a message 10'. If the second terminal is a television, a second session set-up request can take the form of an IGMP (Internet Group Management Protocol) report message commanding subscription of the second terminal to a TV over IP channel. This kind of subscription message is sent to the collection node 200.

According to the invention, the transfer means 110 redirect the change request to a system 600 for controlling a plurality of audiovisual sessions in the form of a message 10'.

In one embodiment of the invention, the access point includes means for recovering information relating to a context of said plurality of sessions from messages transferred by the transfer means 110. In other words, the access point 100 can recover information contained in such a message before relaying it to its addressee, which enables it to keep itself up to date on the status of all sessions in progress. It also plays a proxy role vis-à-vis this type of message. This applies in particular to a home gateway operating in routed mode.

The information recovered includes an indication of the type of session involving said plurality of user terminals.

The access point 100 is advantageously also able to transfer said change requests to the audiovisual session control system 600 if either or both of said at least one first session in progress and the second session relates to transmitting an audiovisual content.

As emerges below, the control system 600 of the invention aims to optimize cohabitation of one or more audiovisual sessions, which are costly in terms of network resources, with conversational or Internet sessions, by proposing a solution to vary easily the quantity of resources allocated to audiovisual sessions. The control system 600 of the invention is therefore preferably invoked while an audiovisual session is in progress.

The control system 600 includes means 610 for receiving the message 10' transferred by the access point 100. This event triggers the means 620 for recovering context information via the link 150, which information relates to any sessions in progress that would involve the access point 100 and the collection node 200.

This context information 12 includes, for example, for each of the sessions in progress:

A profile of the user of a user terminal involved in the session obtained, for example, by extracting the subscription type and the options subscribed to by interrogating the collection node 200 using a mechanism based on a remote control protocol, for example the SNMP (Simple Network Management Protocol). If the collection node is a DSLAM, this data is stored in a table, for example a management information table in a router, a first DSLAM collection node or a decoder terminal (set top box). It should be noted that some information can also be obtained by interrogating the IP network information system if it is not available locally from equipment closer to it.

A real-time measurement of the traffic on the link 150, which can be obtained by interrogating a probe installed at the collection node 200 or at the access point 100 and enables an access point to find out the status of the resources used at any time.

An evaluation of the instantaneous usage of a given user terminal connected to the access point 100. This can be obtained by interrogating a network equipment such as the access point 100 if the terminal is a home gateway sophisticated enough to function in routed mode. The home gateway can then also serve as a proxy for an RTSP type protocol for VoD type audiovisual sessions in point-to-point mode or as an IGMP proxy for television over IP audiovisual sessions, which enables it to find out the status of sessions in progress at any time and to deduce therefrom the current usage at a given time, user terminal by user terminal.

Such information relating to the resources used can be grouped into profiles associated with the user terminals and describing the status of the multimedia sessions in progress.

Such information is used in particular to deduce the quantity of resources in terms of bandwidth available on the link 150 at the time of the request. It is sent to means 630 for evaluating a new distribution of the resources on the link 150 required by the requested change.

The means 630 for evaluating a new distribution of the resources know from the received context information 12 a minimum quantity of resources required to effect the change in the second session.

If the request is a session set-up request, that minimum quantity of resources is positive. If it exceeds the quantity of resources available on the link, the evaluation means 630 evaluates from which sessions in progress resources can be preempted to recover the missing quantity.

In contrast, if the change request is a request for termination of a second session, the quantity of resources necessary to effect the change is negative. The evaluation means 630 then evaluate a new distribution of resources in order to reassign the quantity of resources given up by the second session to the other sessions in progress.

According to the invention, the evaluation means 630 evaluate the possibility of preempting resources from audiovisual sessions in progress, for example from the first session.

According to the invention, the audiovisual content sent to the user terminal TU1 during the first session is encoded in a scaled manner in a plurality of audiovisual streams. For example, scalable content is encoded in 1+N streams (where N is an integer greater than 1), the first stream constituting a basic layer and the following N streams constituting enhancement layers obtained using coding techniques known to the person skilled in the art. Decoding the basic layer yields the audiovisual content with a basic quality and decoding the successive enhancement layers gradually improves on the basic quality. Each stream is then divided into IP packets.

As previously indicated, the audiovisual streams can then be transported either in unicast (point-to-point) mode, multicast (point-to-multipoint) mode or hybrid mode. Unicast mode is used for a VoD session, for example. Multicast mode is used in particular to broadcast television channels to the first access points.

In this example, the audiovisual streams of the first session are transported in multicast mode. They are therefore injected into the network in the form of multicast IP stream groups identified by a pair of addresses (@IPS, @IPG), @IPS being the source address and @IPG the group address.

Table 1 below sets out an example of dividing the audiovisual content into a basic layer and six enhancement layers all transported by different IP multicast groups. The layers are classified in increasing quality order, which conditions a decoding order. In other words, the enhancement layer N can be decoded only if the enhancement layer N−1 has been decoded. Table 1 indicates the bit rate used for each layer.

TABLE 1

| Layer | Bit rate | Transport stream | Target |
|---|---|---|---|
| Basic layer | 2 Mbps | (@IPS; @IP G10) | SD− |
| Enhancement layer 1 | 1 Mbps | (@IPS; @IP G11) | SD |
| Enhancement layer 2 | 1.5 Mbps | (@IPS; @IP G11) | SD |
| Enhancement layer 3 | 2.0 Mbps | (@IPS; @IP G12) | SD+ |
| Enhancement layer 4 | 2.5 Mbps | (@IPS; @IP G13) | HD− |
| Enhancement layer 5 | 3.0 Mbps | (@IPS; @IP G14) | HD |
| Enhancement layer 6 | 3.0 Mbps | (@IPS; @IP G14) | HD+ |

Clearly such a subdivision adapts to the quantity of resources available on a link by sending on that link only the basic layer and an appropriate number of enhancement layers for which the sum of the bit rates used is less than or equal to the quantity of resources available.

It is equally clear that the principle of encapsulating 1+N SVC streams of an audiovisual content in a plurality of broadcast groups facilitates varying the quantity of resources used to transport that content by simply subscribing to/unsubscribing from broadcast groups.

The network content information recovered advantageously includes the IP multicast groups to which the first user terminal subscribes.

The evaluation means 630 therefore calculate for the session in progress how many enhancement streams can be dropped and deduce from this the quantity of resources that can be released in this way. They send the results of their evaluation to adaptation decision and control means 640.

To give a first example, the first user terminal receives a stream corresponding to the 2 Mbps basic layer, the 1 Mbps first enhancement layer, the 1.5 Mbps second enhancement layer, the 2 Mbps third enhancement layer, and the 2.5 Mbps fourth enhancement layer, which adds up to a total of 9 Mbps. In this example this first session busies all the resources. The request to set up a second session relates to a service for downloading via the Internet a VoD (Video on Demand) video content requiring 2.5 Mbps. The evaluation means 630 send the decision means 640 an evaluation result indicating that the quantity of resources required for the change can be pre-empted from the first session by unsubscribing the first user terminal from the broadcast group corresponding to the fourth enhancement stream. Consequently, the decision and adaptation means 640 decide that the change request is acceptable and, to recover the 2.5 Mbps of resources required by the second session, send the second user terminal an acceptance message and the first user terminal an adaptation message that commands it to unsubscribe from the broadcast group (@IPS, IPG13) corresponding to the fourth enhancement layer.

To give a second example, the first session is the only other session in progress, the first terminal subscribes to the broadcast group corresponding to the basic stream and three enhancement streams, and closing the second session recovers 2.5 Mbps. In this configuration, the evaluation means 630 propose to reassign the quantity of resources released to the first session by subscribing it to the broadcast group corresponding to the fourth enhancement stream.

To effect the new distribution of resources proposed by the means 630, the adaptation decision and control means 640 sends the first user terminal TU1 via the access point 100 a message 20 containing parameters for adapting said first session to use the new distribution of the resources. In the first example described above, such adaptation parameters designate the broadcast group G13, from which the first terminal must unsubscribe. In the second example described here, the adaptation parameters designate the broadcast group G13, to which the first terminal must subscribe.

It should be noted that a message 20 of this kind is first received by the transfer means 120 of the access point 100, which relay it to the first terminal TU1.

Figure 3:
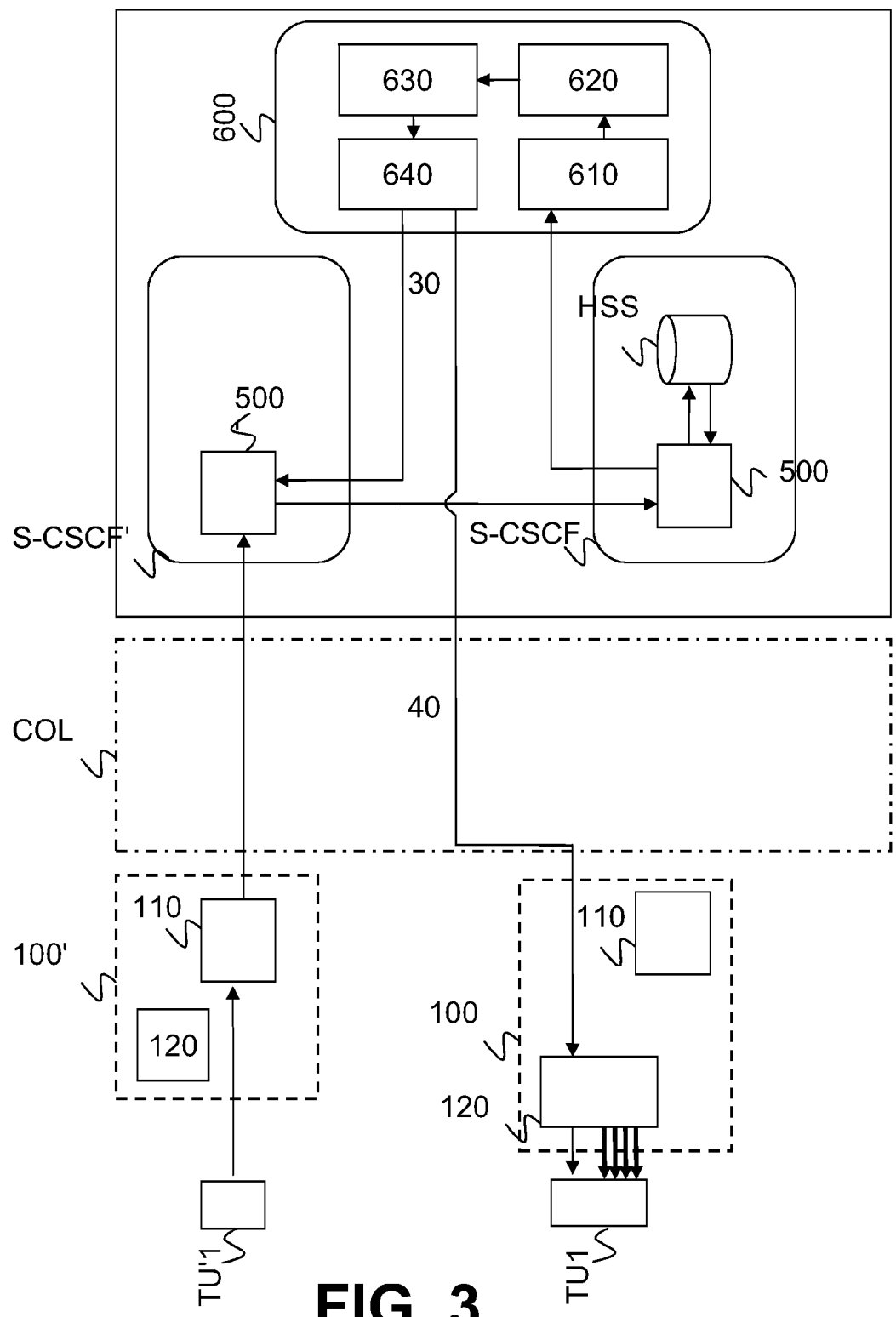
FIG. 3 shows one embodiment of the invention.

Another embodiment of the system and the method of the invention for managing a plurality of sessions is described below with reference to FIG. 3. As in the previous examples, the situation considered is one in which a first user terminal TU1 is involved in an audiovisual first session during which it receives an audiovisual content in the form of a plurality of streams transported by different broadcast groups. In this example, a user terminal TU'1 connected to another access point 100' of another access network RA' to the IP network sends the IP network a high definition videophone session set-up request requiring a bit rate of 1.5 Mbps. This request is relayed by the transfer means 110' of the access point 100' of the access network RA' and then to the core network RC via the collection network COL'. It is received by an S-CSCF' (Serving-Call Session Controller Function) session control entity capable of routing the request to an S-CSCF session control entity responsible for managing calls to and from the user terminal TU1.

It should be noted that the session control entities S-CSCF and S-CSCF' exchange signaling messages using an SIP (Session Initiation Protocol) type protocol. They can be part of an IMS (IP Multimedia Subsystem) architecture, but the invention is not limited to that particular situation. The IMS network architecture was introduced by the 3GPP for mobile networks and then taken up by TISPAN for fixed networks. It enables dynamic setting up and control of multimedia sessions between two user terminals and reservation of resources at media stream transport network level. It also manages interaction between services.

The S-CSCF session control entity receives the request sent by the S-CSCF' entity and interrogates an HSS (Home Subscriber Server) database to recover network context information, in particular a list of services to which the user 1 subscribes. According to the invention, the S-CSCF control entity includes means 500 for sending requests to the session management system 600. The S-CSCF control entity sends the request to the system 600, for example if the user of the first terminal subscribes to a television over IP service, in order to evaluate the possibilities of interaction between the requested conversational service and the audiovisual session in progress.

It should be noted that, in this example, the control system 600 and the session control entity S-CSCF are separate. However, the invention is not limited to this, and having the control system 600 hosted by this kind of session control entity can equally be envisaged.

The request is received by the receiver means 610, which send it to the means 620 for recovering context information. In this example, the quantity of resources allocated to the link 150 between the access point 100 and the collection node 200 is 10 Mbps. The audiovisual first session in progress is using 9 Mbps distributed between the basic stream and the four enhancement streams shown in Table 1. The quantity of resources remaining available is therefore 1 Mbps.

The information linked to resources is sent to the means 630 for evaluating a new distribution of the resources, which evaluate the enhancement streams of the audiovisual content of the first session that can be dropped and deduce from this a quantity of resources that can be released. They send the decision means 640 the result of their evaluation, proposing dropping of the 2.5 Mbps fourth enhancement layer. The decision means 640 send an acceptance message 30 to the S-CSCF' session control entity to set up the call session. They also send the first terminal via the transfer means 120 of its access point 100 a message 40 containing parameters for adapting said first session to effect the new distribution of resources. For example, these parameters specify the broadcast group from which the first user terminal must be unsubscribed.

In one particular implementation of the invention, the steps of the method of the invention of managing a plurality of multimedia sessions are determined by the instructions of a computer program incorporated in a data processing device such as the session control system 600. The program includes program instructions that execute the steps of the method of the invention if said program is loaded into and executed in the device whose operation is then controlled by the execution of the program.

Consequently, the invention applies equally to a computer program, notably a computer program on or in an information storage medium, adapted to implement the invention. This program can use any programming language and take the form of source code, object code or a code intermediate between source code and object code, such as a partially-compiled form, or any other form desirable for implementing the method of the invention.

The information storage medium can be any entity or device capable of storing the program. For example, the medium can include storage means such as a ROM, for example a CD ROM or a microelectronic circuit ROM, or magnetic storage means, for example a floppy disk or a hard disk.

In contrast, the information medium can be a transmissible medium such as an electrical or optical signal, which can be routed via an electrical or optical cable, by radio or by other means. A program of the invention can in particular be downloaded over an Internet-type network.

Alternatively, the information medium can be an integrated circuit incorporating the program, the circuit being adapted to execute the method or to be used in its execution.

The invention claimed is:

1. A method of managing a plurality of multimedia sessions involving user terminals connected to an access point of an IP network including at least one collection node when at least one first session from said plurality of multimedia sessions is an audiovisual session in progress, during which first session a first user terminal receives from the collection node an audiovisual content encoded in the form of at least one scalable video coding audiovisual stream via a link between said access point and said collection node, said scalable video coding audiovisual stream comprising a base layer and at least one enhancement layer, said method comprising the steps, performed by a control system, of:

receiving, from the access point, a message including a change request relating to a change affecting a second session from said plurality of multimedia sessions;

recovering information relating to a context of said plurality of sessions, the recovered information including at least a quantity of resources available on said link, a quantity of resources used by said at least one first session, a quantity of resources used by the at least one enhancement layer of the scalable audiovisual stream from said at least one first session in progress, and a minimum quantity of resources required to effect said change in the second session;

evaluating a new distribution of resources between said at least one first session in progress and said second session induced by the requested change in the second session from the quantity of resources available on the link, the quantity of resources used by the at least one enhancement layer of the scalable audiovisual stream from said at least one session, a quantity of resources used by said at least one first session in progress, and the minimum quantity of resources required for said change;

deciding to accept or reject the change request as a function of the result of said evaluation and sending a message containing said decision; and in the event of a positive decision, commanding adaptation of the transfer of the audiovisual content effected on said link during said at least one first session by suppressing at least one enhancement layer from said at least one audiovisual scalable video coding stream.

2. A method according to claim 1, wherein the step of recovering information relating to a context sends requests to entities of the IP network responsible for managing said plurality of sessions and stores the recovered information in profiles associated with the user terminals.

3. A method according to claim 1, wherein said at least one scalable video coding audiovisual stream is transported by a plurality of broadcast groups and the step of commanding adaptation of the transfer of the audiovisual content sends the first terminal via said link a message containing adaptation parameters designating the broadcast groups to which said first user terminal can subscribe or from which said first user terminal must unsubscribe.

4. A method according to claim 1, wherein said at least one scalable video coding audiovisual stream is transported in point-to-point mode on said link and the step of commanding adaptation of the transfer of the audiovisual content sends the first terminal via said link a message containing adaptation parameters designating the audiovisual streams that it can request to receive.

5. A method according to claim 3, wherein if the change request is a request to set up the second session said adaptation parameters designate one or more broadcast groups from which said first terminal must be unsubscribed.

6. A method according to claim 5, wherein if the change request relating to the second session is a request to close the second session said adaptation parameters designate the broadcast groups from which said first terminal can be unsubscribed.

7. A method according to claim 1, wherein when said second session is a conversational session managed by a session control entity, wherein said change request is received from said session control entity and said message containing said decision to accept or reject the request is sent to said session control entity.

8. A method according to claim 1, wherein said recovered information includes at least one type of subscription of said first and second users and said evaluation step takes account of the type of subscription of said first and second users in evaluating a new distribution of resources.

9. A system for controlling a plurality of multimedia sessions involving user terminals connected to an access point of an IP network including at least one collection node when at least one audiovisual first session that is one of said plurality of multimedia sessions is in progress, during which first session said first user terminal receives from the collection node an audiovisual content encoded in the form of at least one scalable video coding audiovisual stream via a link between said access point and said collection node, said scalable video coding audiovisual stream comprising a base layer and at least one enhancement layer, said system comprising a control system, said control system comprising a processor configured to:
    receive from said access point a change request relating to a change affecting a second session that is one of said plurality of sessions;
    recover information relating to a context of said plurality of sessions, the recovered information including at least a quantity of resources available on said link, a quantity of resources used by said at least one first session, a quantity of resources used by the at least one enhancement layer of the scalable audiovisual stream from said at least one first session in progress, and a minimum quantity of resources required to effect said change in the second session;
    evaluate the possibility of a new distribution of resources between said at least one first session in progress and said second session induced by the requested change in the second session from the quantity of resources available on the link, the quantity of resources used by said at least one session, a quantity of resources used by the at least one enhancement layer of the scalable audiovisual stream from said at least one first session in progress, and the minimum quantity of resources required for said change if the minimum quantity of resources required is greater than the quantity of resources available for said link; and
    decide to accept or reject said request adapted in the event of a positive decision to command adaptation of the transfer of the audiovisual content effected on said link during said at least one first session by suppressing at least one enhancement layer from said at least one scalable video coding audiovisual stream.

10. A system according to claim 9, wherein the control system is further configured to send a message accepting said request to an entity of the network responsible for effecting the change requested.

11. A platform for managing audiovisual services in an IP network, wherein it includes a system for controlling a plurality of sessions involving user terminals connected to an access point of an IP network including at least one collection node while at least one first session that is an audiovisual session and is one of said plurality of sessions is in progress, and wherein during the first session a first user terminal receives from the collection node an audiovisual content encoded in the form of at least one scalable video coding audiovisual stream via a link between said access point and said at least one collection node, said scalable video coding audiovisual stream comprising a base layer and at least one enhancement layer, said system comprising a control system, said control system comprising a processor configured to:
    receive from said access point a change request relating to a change affecting a second session that is one of said plurality of sessions;
    recover information relating to a context of said plurality of sessions, the recovered information including at least a quantity of resources available on said link, a quantity of resources used by said at least one first session, a quantity of resources used by the at least one enhancement layer of the scalable audiovisual stream from said at least one first session in progress, and a minimum quantity of resources required to effect said change in the second session;
    evaluate the possibility of a new distribution of resources between said at least one first session in progress and said second session induced by the requested change in the second session from the quantity of resources available on the link, the quantity of resources used by said at least one session, a quantity of resources used by the at least one enhancement layer of the scalable audiovisual stream from said at least one session in the audiovisual first session in progress, and the minimum quantity of resources required for said change; and
    adapt said new distribution to suppress at least one enhancement layer from the scalable video coding audiovisual streams sent to said first terminal via said link.

12. A session control entity responsible for managing a change relating to a conversational second session that is one of a plurality of audiovisual sessions involving a plurality of user terminals connected to an access point of an IP network including at least one collection node when at least one audiovisual first session is in progress during which first session a first user terminal receives from the collection node an audiovisual content encoded in the form of at least one scalable video coding audiovisual stream via a link between said access point and said at least one collection node, said scalable video coding audiovisual stream comprising a base layer and at least one enhancement layer, said session control entity comprising a control system configured to recover information relating to a context of said plurality of sessions and to send a change request to an audiovisual session control system, said control system comprising a processor configured to:
    receive from the access point said change request relating to said second session;
    recover information relating to a context of said plurality of sessions including a quantity of resources available on said link, a quantity of resources used by said at least one first session, a quantity of resources used by the at least one enhancement layer of the scalable audiovisual stream from said at least one first session in progress, and a minimum quantity of resources required to effect said change in the second session;
    evaluate the possibility of a new distribution of resources between said at least one first session in progress and said second session induced by the requested change in the second session from the quantity of resources available on the link, the quantity of resources used by said at least one first session, a quantity of resources used by the at least one enhancement layer of the scalable audiovisual stream from said at least one session in the audiovisual first session in progress, and the minimum quantity of resources required for said change; and adapt the transfer of the audiovisual content effected on said link during said first session by suppressing at least one enhancement layer from said at least one scalable video coding audiovisual stream to effect said new distribution of resources.

13. A non-transitory computer-readable storage medium storing a computer program product for managing a plurality of multimedia sessions involving user terminals connected to an access point of an IP network including at least one collection node when at least one first session from said plurality of multimedia sessions is an audiovisual session in progress, during which first session a first user terminal receives from the collection node an audiovisual content encoded in the form of at least one scalable video coding audiovisual stream via a link between said access point and said collection node, said scalable video coding audiovisual stream comprising a base layer and at least one enhancement layer, said method comprising the steps, performed by a control system, said computer program product containing instructions for executing the steps of:

receiving from said access point a message including a change request relating to a change affecting a second session from said plurality of multimedia sessions;

recovering information relating to a context of said plurality of sessions, the recovered information including at least a quantity of resources available on said link, a quantity of resources used by said at least one first session, a quantity of resources used by the at least one enhancement layer of the scalable audiovisual stream from said at least one first session in progress, and a minimum quantity of resources required to effect said change in the second session;

evaluating a new distribution of resources between said at least one first session in progress and said second session induced by the requested change in the second session from the quantity of resources available on the link, the quantity of resources used by said at least one session, a quantity of resources used by the at least one enhancement layer of the scalable audiovisual stream from said at least one session in the audiovisual first session in progress, and the minimum quantity of resources required for said change;

deciding to accept or reject the change request as a function of the result of said evaluation and sending a message containing said decision; and in the event of a positive decision, commanding adaptation of the transfer of the audiovisual content effected on said link during said first session by suppressing at least one enhancement layer from said at least one scalable video coding audiovisual stream.

* * * * *